(12) United States Patent
Gardos et al.

(10) Patent No.: US 7,251,826 B1
(45) Date of Patent: Jul. 31, 2007

(54) DOMAIN MANAGER FOR PLURAL DOMAINS AND METHOD OF USE

(75) Inventors: Robert D. Gardos, New York, NY (US); Adam D. Burstein, Brooklyn, NY (US); Shamoun Murtza, Hackensack, NJ (US); Chia Hsian-Yeh, Flushing, NY (US); Anupama Vajjalla, Iselin, NJ (US)

(73) Assignee: Register.Com, Inc., New York, NY (US)

( * ) Notice: Subject to any disclaimer, the term of this patent is extended or adjusted under 35 U.S.C. 154(b) by 1160 days.

(21) Appl. No.: 09/587,403

(22) Filed: Jun. 5, 2000

Related U.S. Application Data

(60) Provisional application No. 60/137,908, filed on Jun. 7, 1999.

(51) Int. Cl.
 *H04L 9/32* (2006.01)
(52) U.S. Cl. .............................. 726/6; 726/3; 709/225; 715/700
(58) Field of Classification Search ................ 713/201; 707/10, 100, 1; 709/202, 223–226, 217; 726/3, 6; 715/700; 455/422.1, 3.01
 See application file for complete search history.

(56) References Cited

U.S. PATENT DOCUMENTS 6,374,295 B2 * 4/2002 Farrow et al. ............... 709/223
6,564,216 B2 * 5/2003 Waters ......................... 707/10
6,654,891 B1 * 11/2003 Borsato et al. ............. 713/201

OTHER PUBLICATIONS

InterNIC: Updating Domain Name & Associated Records, Aug. 25, 1998.*
InterNIC: Domain Name Registration Overview, Aug. 25, 1998.*
InterNIC: Registration Process Overview, Jan. 20, 1998.*

* cited by examiner

*Primary Examiner*—T. B. Truong
(74) *Attorney, Agent, or Firm*—Hogan & Hartson LLP

(57) ABSTRACT

A system and method that facilitates entities acting as agents to manage plural domains for plural registrants includes a domain manager capable of direct attachment to the shared registry system. The domain manager resides on a server of an accredited registrar or on a server of a partner website that has made a server of an accredited registrar authoritative for at least plural domain names. A variety of DNS or zone file information can be altered using simple graphical user interfaces to enter change information and pass that change information to the domain manager server. The domain manager server passes the change information to the DNS servers either directly through the SRS or through an accredited server that passes the change information through the SRS and to the root servers. Most preferably, the domain manager has substantially direct access to the shared registry system, which asynchronously updates the DNS servers. The domain manager may also provide a variety of utilities that allow an operator to perform diagnostics on the domain, its name and its registration.

20 Claims, 6 Drawing Sheets

DOMAIN MANAGER FOR PLURAL DOMAINS AND METHOD OF USE

PRIORITY AND RELATED APPLICATION NOTICE

This application claims priority from U.S. provisional patent application Ser. No. 60/137,908, filed Jun. 7, 1999, which application is hereby incorporated by reference in its entirety. This application relates to U.S. patent application Ser. No. 09/560,433, filed Apr. 27, 2000, which application is hereby incorporated by reference in its entirety.

COPYRIGHT NOTICE

A portion of the disclosure of this patent document contains material subject to copyright protection. The copyright owner has no objection to the facsimile reproduction by anyone of the patent document or patent disclosure, as it appears in the U.S. Patent and Trademark Office patent file or records, but otherwise reserves all copyright rights whatsoever.

BACKGROUND OF THE INVENTION

1. Field of the Invention

The present invention relates generally to the Internet and more specifically to a method of managing aspects of an Internet domain, such as registration and modification of domain names and their associated records.

2. Description of the Related Art

Each computer on the Internet is identified by a unique Internet protocol ("IP") address. This address is a 32-bit number organized as four 8-bit values separated by periods such as 123.45.67.89. Such a numerical system, while useful as a routing address system for computer-to-computer communication, is not human user-friendly. Consequently, domain names are used to allow users to more easily identify and connect to a target computer on the network. These user-friendly domain names (or "host names"), such as "register.com", are easy for users to remember and, since they map to a unique IP number, accurately identify the computer's IP address.

As with the underlying Internet address, domain names typically have a hierarchical organization, with the trailing portion of the domain name, such as .com, .net, .org, .us, .uk or .jp, representing the top-level domain. Top-level domains include global top-level domains (gTLD) and country specific or country code top-level domains (ccTLD). The global top-level domains include .com, .org, .net, .edu, .gov and .mil. Of these, .edu, .gov and .mil gTLD's are restricted to use by entities meeting specific qualifications. Country code top-level domains are country specific in that they identify registrations within a given country. The specific country governs registration for the country code top-level domains. Some countries are "open" in that they allow any entity to register a domain name within its ccTLD. Other countries are "closed" and only allow entities that meet restrictions such as residency to register domain names in that ccTLD. Most domain users presently use one or more of the .com, .net or .org gTLDs.

The domain name entered by a user is sent over the Internet to a global network of servers called the "domain name system" (DNS), which receives the domain name as a request and translates the domain name into the target computer's numerical IP address. The numerical IP address is returned to the user's computer to enable it to connect to the target computer. Typically, after the user enters the domain name, the rest of the process is invisible to the user until the user connects to the target computer. The domain name system consists of a collection of root servers or DNS Servers that provide a directory linking domain names with corresponding IP addresses. There are presently thirteen root servers worldwide that contain authoritative databases listing all top-level domains. The collection of root servers is centrally managed for all global top-level domains to ensure that each computer on the network can be uniquely identified by unique domain names and numerical addresses.

A "registry" is an international organization or entity that is responsible for assigning domain names and Internet protocol addresses. Each country maintains its own registry, generally through a company or organization. The registry has the responsibility to record and update domain names and Internet protocol addresses, as well as the information associated with them, on the root servers. A registry is under contract from its respective government to control domain name registration. The registry may authorize other entities, known here as registrars, to conduct domain name registration and other aspects of the management of domain names and IP addresses.

A "registrar" is an organization or company that is authorized to provide registration services for all users of certain top-level domains, such as the .net, .org and .com global top-level domains. Registrars are presently authorized either by ICANN, the Internet Corporation for Assigned Names & Numbers, a U.S. governmental organization under the Department of Commerce, or by the registrar's respective government to control domain name registration. A registrar is authorized by the registry to act as an agent of the registrar to process domain name registration. The registrar has the responsibility to create and maintain a Whois database and zone files for its customers. Examples of registrars presently include Register.com and Network Solutions, Inc., both of which are authorized by ICANN.

A "registrant" is the individual or organization to whom a specific domain name is registered with the registry. Once a registrant has registered a domain name, paid the associated fees and met certain conditions, the individual or organization holds the domain name for use for a specific period of time. The registrant can use the domain name for such purposes as web hosting and e-mail. In many cases, the registrant may incorporate one or more domain names into an organizational identity or business. As such, a registration to use a particular domain name can be viewed as a significant asset for certain registrants.

The "shared registry system" (SRS) is a system that permits multiple registrars to provide registration services for the .com, .net and .org domains. The system is a shared database that holds information about domain names and their authoritative name servers. The shared registry system updates the root servers with information about the domain names within the .com, .org and .net gTLDs about every twenty-four hours in typical operation. The SRS allows accredited registrars to enter information about newly registered domain names into the SRS, and the information about the newly registered domain names is then uploaded to the root servers. Accredited registrars can update name server information within the SRS for domain names for which they are recognized as registrar. Accredited registrars are registered with the SRS and access the SRS through a secure and authenticated communication channel, such as through a secure socket level encrypted communication link.

The SRS facilitates the updating of domain name and IP address information and also provides a utility for identifying the registrar that registered a domain name, when the entry to the SRS was created and the authoritative name servers for the domain name.

Different entities may be responsible for registering and managing a significant number of domain names. It is consequently desirable to provide a management system that can allow an agent to register and manage a plurality of domain names for a plurality of different registrants.

SUMMARY OF THE PREFERRED EMBODIMENTS

An aspect of the present invention provides a domain management system, having means for requesting authentication from a party seeking access to the domain management system. The system includes domain identification means coupled to receive input from a party seeking access to the domain management system for accepting and confirming identity of a domain name to be an active domain name. Information change means accepts a request to change information about the active domain name, passes an information change request toward an authoritative database for like information about domain names, and generates a confirmation message displayable to a party using the domain management system.

Another aspect of the present invention provides a domain management system having an authentication interface that generates a message that, when received by an operator terminal, at least in part causes display on the operator terminal of a request for authentication from a party seeking access to the domain management system. A domain identification interface within the system generates a message that, when received by the operator terminal, at least in part causes display on the operator terminal of a request for input of a domain name to be an active domain name from an operator seeking access to the domain management system. The system preferably also includes an information change engine that accepts requests to change information about the active domain name, passes an information change request to an authoritative database for like information about domain names, and generates a confirmation message that, when received by the operator terminal, at least in part causes display of a screen confirming execution of the information change request.

BRIEF DESCRIPTION OF THE DRAWINGS

The embodiments and advantages of the present invention can be better understood in conjunction with the various drawings, which form a part of the disclosure of the present invention.

FIG. 4 illustrates an exemplary authorization facilitation screen that might be used in an implementation of aspects of the present invention.

FIG. 5 illustrates an exemplary IP address information change screen that might be used in an implementation of aspects of the present invention.

FIG. 6 illustrates an exemplary alias information change screen that might be used in an implementation of aspects of the present invention.

FIG. 7 illustrates an exemplary mail exchange server information change screen that might be used in an implementation of aspects of the present invention.

DETAILED DESCRIPTION OF THE PREFERRED EMBODIMENTS

Figure 1:
FIG. 1 illustrates an exemplary start screen that might be used in an implementation of aspects of the present invention.

Potential and current domain name registrants might use a variety of different mechanisms for registering new domain names, maintaining domains and updating domain information. An organization might register its domain names and manage its domains directly with an accredited registrar, where the registrar can directly access the shared registry system (SRS). This option provides considerable advantages when the registrant uses the registrar to manage the domain names, because accredited registrars can control much of the information associated with a domain name registration.

Alternately, a registrant might register a domain name through an unaccredited registrar that does not have the authority to directly access the SRS. Unaccredited registrars generally access the SRS, register new domain names and update information about those domain names through an accredited registrar. So long as the unaccredited registrar can provide reliable and responsive service, many registrants may find this strategy desirable as providing a type of "one stop shopping." For example, the registrant might presently be using an Internet Service Provider (ISP) for a variety of services such as Internet access, e-mail service and website hosting. It is convenient then for the registrant to use domain name registration and management services provided through the ISP.

Preferred embodiments of the present invention provide an interface and a toolset to allow an entity, such as an accredited registrar or an unaccredited registrar like an Internet service provider (ISP), to act as agent for a domain name registrant for the maintenance and modification of the registrant's domain names. Most preferably, aspects of the present invention provide a domain manager and management method adapted to allow an agent of a registrant to register and manage a plurality of domain names for a plurality of registrants. Preferred implementations of the present invention allow modification by an agent of a registrant the zone file entries, Whois information and name server information of that registrant. In particularly preferred implementations, greater management functionality is available when the domain manager is on a server associated with the authoritative domain name server for a particular domain name. For this particularly preferred configuration, the domain manager has the ability to modify IP addresses, domain aliases, MX records and start of authority (SOA) information for the domain name.

In the preferred implementations illustrated in the figures, the domain manager may be a web-based application and might preferably be installed at least partially within the web servers of an accredited registrar. The functionality of the domain manager is accessible through text links on web pages in the familiar manner. The links may be written in hypertext markup language (HTML) or in a successor language providing similar and expanded functionality. Such HTML links are interpreted within the web servers and may access further functionality within either the web servers or in backend application servers. These functions may, for example, be written in one of the known scripting languages and preferably provide access to resources such as database engines within an application server environment. It should be understood, however, that the illustrated implementation might be written in a number of different messaging languages, may or may not access functions written in scripting languages, and may access a variety of different backend applications to achieve the described message interchanges, tools and utilities. Moreover, the illustrated embodiments may be partially or wholly contained within web servers and may or may not access applications servers for further functionality. Depending on the traffic and number of domain names that are being managed, all of the system described here may be implemented on a single server while in other installations the system may require a farm of web servers sometimes working in conjunction with a farm of application servers.

A preferred embodiment of the present invention provides a system and method that facilitates entities acting as agents to manage plural domains for plural registrants. The invention might include a domain manager capable of coupling to the shared registry system and capable of performing a number of domain management functions. The domain manager may in some implementations reside on a server of an accredited registrar or on a server of a partner website that has made a server of an accredited registrar authoritative for at least plural domain names. A variety of DNS or zone file information can be altered using simple graphical user interfaces to enter change information and pass that change information to the domain manager. The domain manager passes the change information to the DNS servers either directly through the SRS or through an accredited server that passes the change information through the SRS and to the root servers. Most preferably, the domain manager has substantially direct access to the shared registry system, which asynchronously updates the DNS servers. The domain manager may also provide a variety of utilities that allow an operator to perform diagnostics on the domain, its name and its registration.

Figure 2:
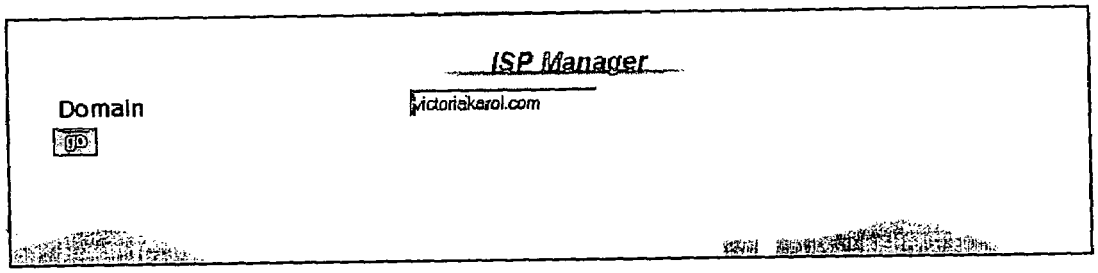
FIG. 2 illustrates an exemplary domain name selection screen that might be used in an implementation of aspects of the present invention.

Referring to FIG. 1, a start screen for the domain manager is illustrated. In this illustrative implementation, it is assumed that the operator accessing the domain manager is acting as an agent for a domain name registrant to modify some information about the domain name or perform another domain management function. Such a start screen preferably requests identification and authentication information from the operator to ensure that the agent is authorized to use the domain manager and to make changes for that domain. Once logged in or otherwise authenticated through a screen like that illustrated in FIG. 1, a screen such as that illustrated in FIG. 2 appears to prompt for the domain name to be modified or managed by the operator. Once the domain name is entered, the operator sends the name to the domain manager server, which accesses information about the domain name and returns a function select screen.

Information is gathered about the domain name and the domain manager server returns a screen that allows the operator to select the management functionality to be executed. For example, the domain manager may cause a screen like that illustrated in FIG. 3. Most preferably, the returned function screen illustrates all of the functions that can be performed on that domain name by that operator. It should be appreciated that certain functionality is accessible only to the original or authorized registrar for a domain name and so certain registrant agents may be unable to perform certain maintenance or management functions. When the agent initially registered the domain name for the registrant through the domain manager, the agent is preferably automatically recognized as authoritative for that domain name. An agent is also preferably recognized as authoritative when the agent has previously accessed the domain manager and received authentication for that particular domain name.

Figures 4, 5:
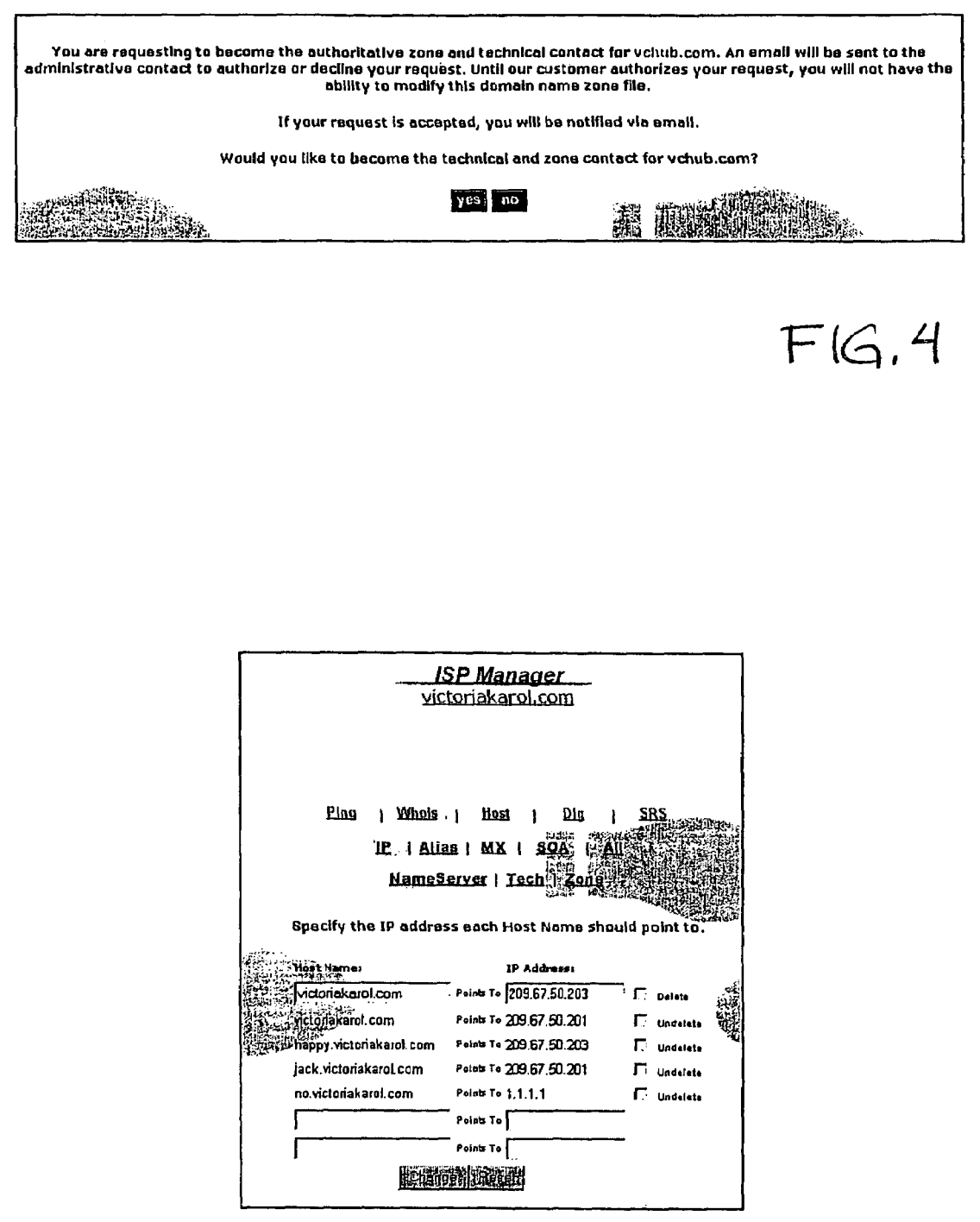

For agents not already recognized as authoritative, further authentication is preferably requested. Operators that are technical contacts or domain name administrators may enter a domain name to be managed and the domain manager issues a screen such as that illustrated in FIG. 4 to request further authentication. As shown in this example, the domain manager might inform the operator not already recognized as authoritative that the operator is asking to be recognized as the authoritative zone and technical contact of the indicated domain name. The screen of FIG. 4 indicates that authorization for the operator's request must be confirmed from the administrative contact for the domain name. The operator clicks on the appropriate button to indicate that the indicated action is desired. The domain manager sends e-mail to the administrative contact for the domain name and waits for confirmation from the administrative contact that authorization is proper. Upon authorization, the domain manager recognizes the operator as the authoritative zone and technical contact for that domain name.

Note here that the domain manager has accessed information about the administrative contact for the domain name. This is but one piece of information about a domain that might be accessed in any given management session. Some of the domain information might be stored within a database associated with or accessible from the domain manager. On the other hand, locally stored information might not be current or complete. As such, the domain manager preferably directly contacts the shared registry system (SRS) to retrieve information about a domain being managed. The SRS is the most authoritative source of data for .com, .net and .org domain name registration status and authoritative name server information, as all .com, .net and .org registrars update the SRS in real time. When the domain manager alters information regarding a domain or a domain name, the domain manager most preferably updates the SRS in real time by directly accessing the SRS to change the information.

The domain manager preferably resides on the web servers of an accredited registrar so that the domain manager has direct access to the SRS. Domain names that can be managed include not only those registered directly through the accredited registrar, but also those registered through partner websites. As discussed above, an accredited registrar may provide indirect registration services to unaccredited registrars, such as web hosting services or Internet service providers. All of these various registration channels can result in domain names being registered through the domain manager. All of these domain names can be managed through the domain manager, although an operator for one unaccredited partner website cannot manage a domain name registered through another partner website unless authorization is received.

The domain manager preferably maintains a database of information for those domain names that were registered through the domain manager. When an operator attempts to access a domain name not registered through the domain manager, the domain manager preferably issues a message to that effect. Different users of the domain manager may have the ability to access different levels of functionality. It should be appreciated that practice of less than all of the functionality of the domain manager is an anticipated practice of the present invention.

Referring once again to FIG. 3, an operator can select among three general categories of functions: diagnostics (ping, Whois, host, dig, SRS); DNS/zone file information (IP, alias, MX, SOA, all) and registrar (nameserver, tech, zone). One of the types of information that can be modified by the domain manager is DNS/zone file related information, which is the information contained in or related to name server or zone file entries. Since zone files are stored on the name servers that are authoritative for the domain name, any modifications to this information must be entered into the name server responsible for that domain name. Because of this presently standard characteristic of zone files, only those with direct access to the specific name server can perform edits to the zone file for a domain name. Operators using implementations of the domain manager can edit zone file information for a domain name only if the domain name lists the domain manager's server as authoritative for the domain name. This is because the domain manager can submit updates to associated name servers, but cannot directly modify DNS (domain name system) entries on name servers administered by other organizations where the domain manager is not recognized as authoritative. If a domain name lists a different organization's name servers as authoritative for the domain name, options to edit zone file information will not be available from the domain manager.

Figure 3:
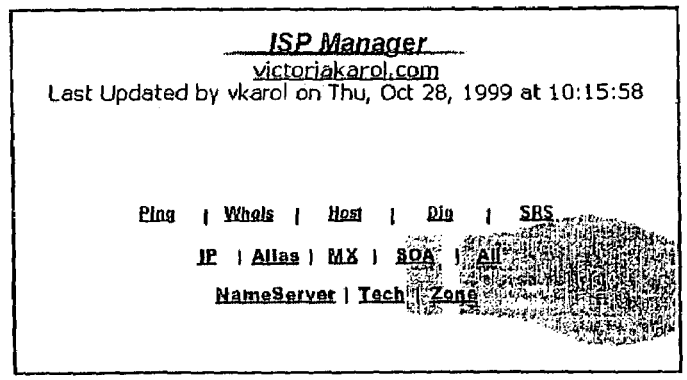
FIG. 3 illustrates an exemplary function selection screen that might be used in an implementation of aspects of the present invention.

When the domain manager is recognized as authoritative, the domain manager preferably displays function options on the screen of FIG. 3 including IP, alias, MX, SOA and all. The IP designation references the domain name's IP address from the zone file and allows access to a screen such as that shown in FIG. 5 that facilitates changes to the IP address. The most common use of this screen is to connect a domain name to desired appropriate web servers or web sites on the Internet. Operators of domain manager can edit the IP address and create "A Record" host entries as long as the domain manager's server is the authoritative name server for the domain name. Host domain names are entered as indicated and the desired corresponding IP address is entered. When the screen is complete either with original or changed information, the operator sends the completed screen to the domain manager. The domain manager then sends the information regarding the IP address information or changes directly to the shared registry system (SRS) for immediate updating of the DNS information within the SRS.

Figures 6, 7:
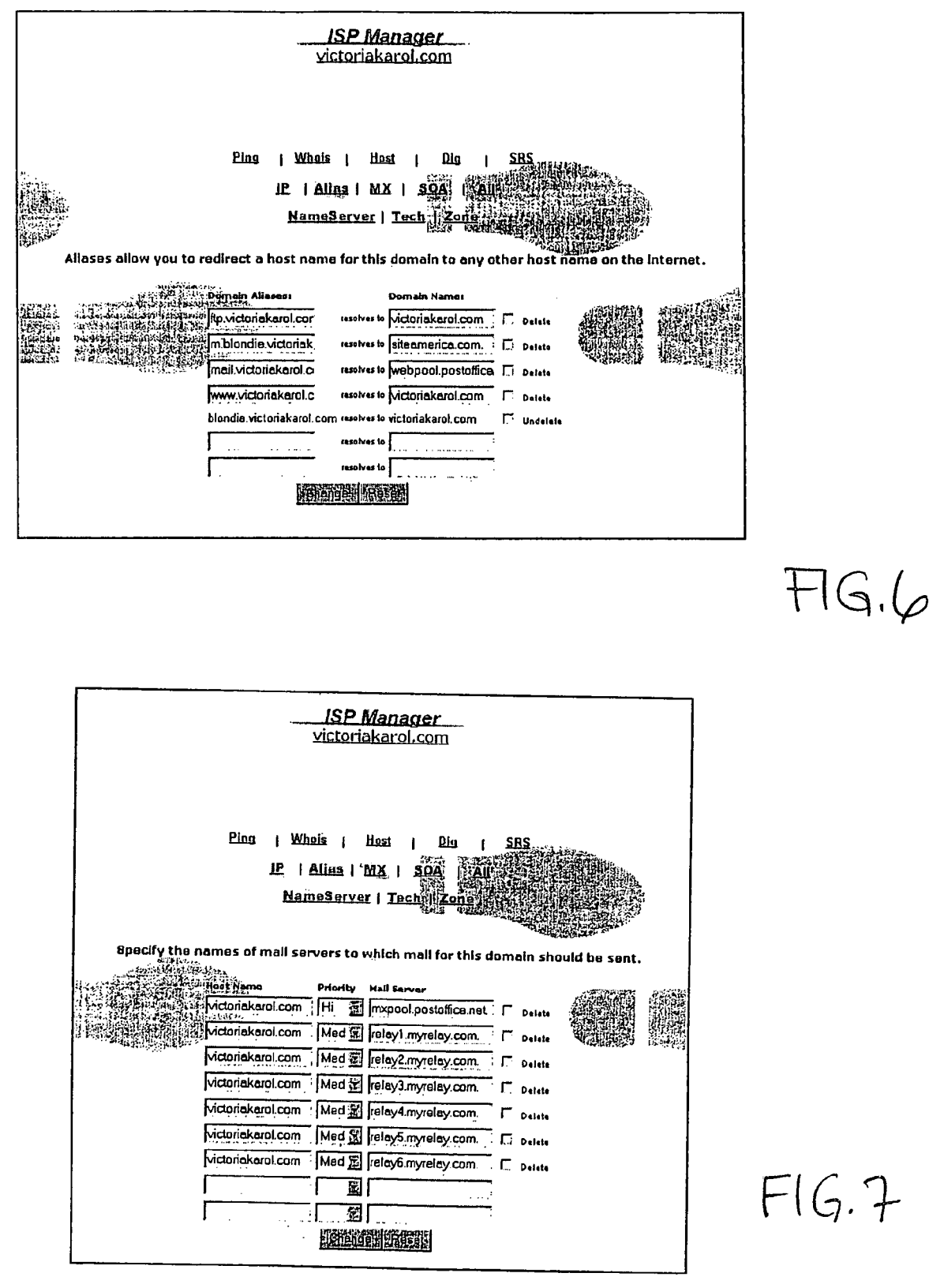

Another piece of zone information that can be edited within domain manager is the domain alias information, which can be used to create or modify "C-names". Clicking on the alias link brings up an alias screen such as that shown in FIG. 6. As illustrated in FIG. 6, the domain manager retrieves the aliases associated with a domain name to display the aliases and the domain names to which the aliases resolve. Here, as with other information retrieved for various aspects of the domain manager, the domain manager looks both to an internal database for entries related to the domain name and to the SRS as the most authoritative collection of information. Here, as with other information retrieved for domain manager, the information drawn from the SRS is considered to be accurate and is used rather than information within the local database whenever the information requested is in both the local and SRS databases.

If no aliases have been established for the domain name, the www and ftp aliases are set to default settings. It is possible to change these aliases so that the aliases resolve to different domain names, as desired. This is accomplished in the illustrated embodiment using conventional graphical user interface screens. New domain aliases can be created in similar fashion by first entering the alias to be created and then entering the domain name to which the new alias should resolve. Following completion of the alias screen changes, an operator sends the data to the domain manager and the domain manager updates the information related to aliases within the SRS.

Another type of DNS/zone information modifiable through the domain manager are the mail exchange features indicated in the function selection screen illustrated in FIG. 3 with the designation MX. Taking the MX link preferably causes the domain manager to return a mail exchange server screen similar to that illustrated in FIG. 7. From the illustrated page, an operator specifies the mail servers that are to handle e-mail for the active domain name. The active host domain name is entered into the fields on the left hand side of the screen. The corresponding mail servers that are to distribute e-mail are entered in the corresponding slots on the right hand side of the screen and the various e-mail servers are assigned priorities for handling the e-mail. Preferably a single primary mail server is identified as having the primary responsibility for distributing mail. Entries should be provided for the primary and each of the backup mail servers. Once the screen is completed the operator sends the screen to the domain manager and the domain manager updates the MX information within the zone file. Should an MX screen such as that illustrated in FIG. 7 be requested after mail servers have been initially designated, the domain manager preferably retrieves the MX information from the zone file to fill in the screen to facilitate changes. Should complete changes be desired, the MX screen is preferably capable of being reset with a single click, as are the rest of the data screens illustrated in this discussion.

Figure 8:
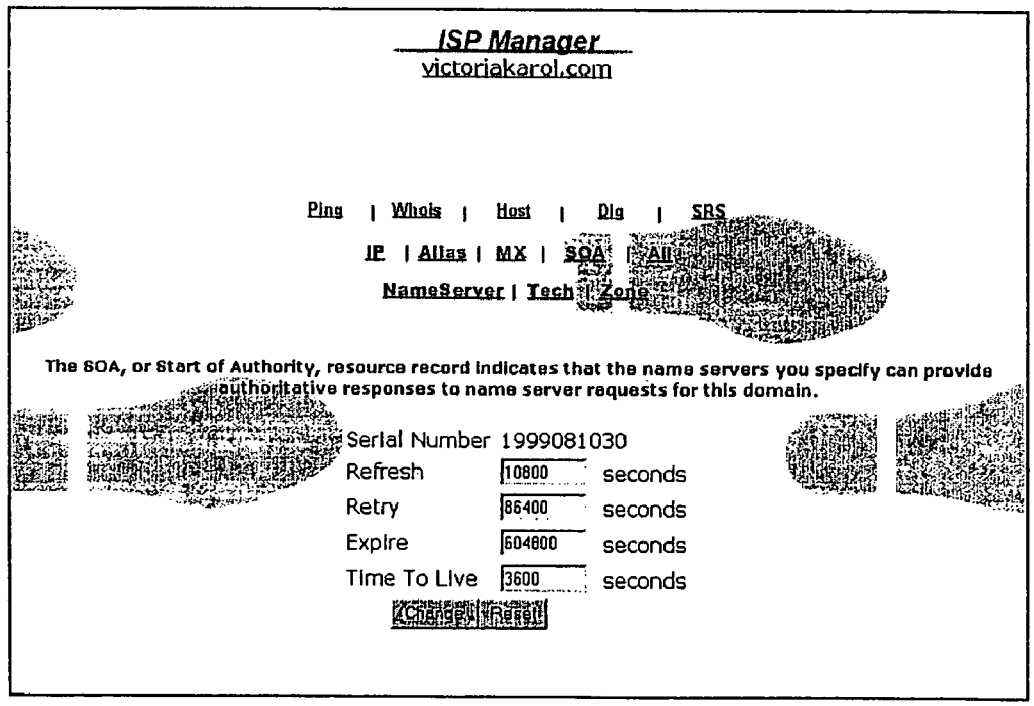
FIG. 8 illustrates an exemplary start of authority information change screen that might be used in an implementation of aspects of the present invention.

Another aspect of zone information that can be changed through the domain manager is the start of authority record, accessed through the function selection screen of FIG. 3 by selecting the SOA link. When this link is selected, the domain manager returns a SOA record screen such as that illustrated in FIG. 8. As shown, the domain manager allows setting or modification of the refresh, retry, expire and time to live data associated with the start of authority information. New values can be entered into any of these fields and the screen with the changed information can be sent to the domain manager. As with all of the information change screens discussed here, the domain manager sends to the operator an indication that the changes were received and entered by the domain manager. The domain manager passes the information on to the SRS and the information within the authorized domain name servers is updated when those servers are next reloaded with the data from the SRS. The domain name servers might be updated, for example, every twenty-four hours.

Figure 9:
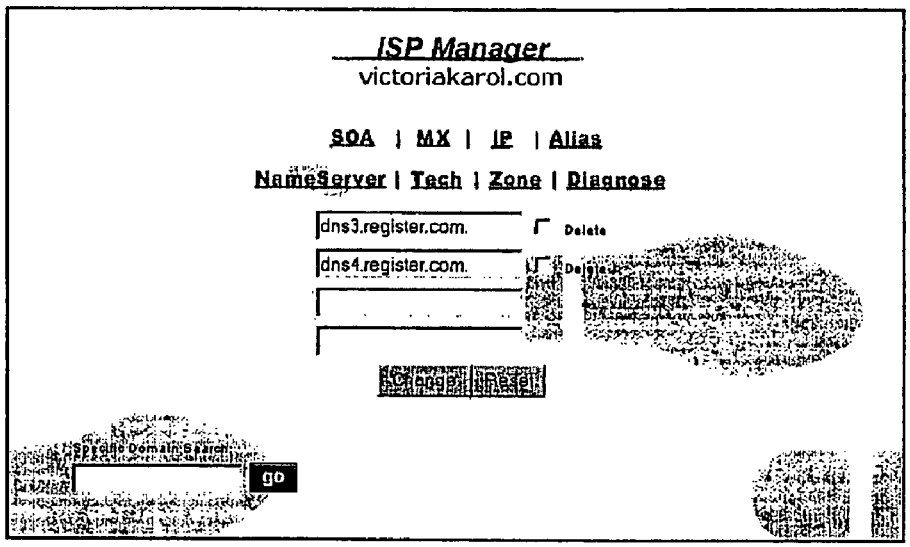
FIG. 9 illustrates an exemplary nameserver information change screen that might be used in an implementation of aspects of the present invention.

Referring once again to the function selection screen of FIG. 3, the domain manager also facilitates updating information more specific to the registrar. These functions allow an operator to change information maintained by the registrar for updating the information in the registry and any applicable Whois databases. Such information is typically not included in the domain name's zone file. Modifications to this information is therefore preferably limited to systems directly linked to the registry; that is, through an accredited registrar. Selecting any of the nameserver links illustrated in the various figures, including in the master function select screen of FIG. 3, preferably causes the domain manager to return a screen like that illustrated in FIG. 9. The nameserver screen illustrated in FIG. 9 allows an operator to designate the nameserver that is to be authoritative for the active domain name. Note that the presently active domain name is indicated in this information change screen at the top of the screen. Most preferably this convention, or another convention that displays the active domain name in a consistent position on all information change screens, is provided throughout the information change screens.

To assign a new primary or secondary authoritative name server for the active domain, an operator selects one of the primary or secondary fields and edits the information by deleting the current information and entering the name of the new authoritative name server. The operator sends the changed screen information to the domain manager and then domain manager checks to ascertain the IP address of the newly identified name server. If a valid IP address is not returned, the domain manager might identify this as an error condition and request entry of a new domain name for the authoritative name server. Otherwise, the domain manager asks for the operator to enter the IP address for the authoritative name server. This allows the operator to identify a new name server and to associate an IP address with that name server. Once the changes are entered, the operator sends the screen to the domain manager. The domain manager checks the validity of the information provided through this screen before sending a confirmation message to the operator. After error checking, the domain manager updates the SRS to change the identity of the authorized domain name servers. Once the change is effected, further changes to registrar-related and DNS/zone file information cannot be made through the same instance of the domain manager.

As with the nameserver information, certain aspects of the contact information for a domain name can also be changed through domain manager. For example, selecting the tech link on the function select screen of FIG. 3 allows an operator select a technical contact for a particular domain. Similarly, an operator selects the zone contact link to change contact information and enters the information about the organization and person within that organization who is authorized to request and make changes to the zone file.

Figure 10:
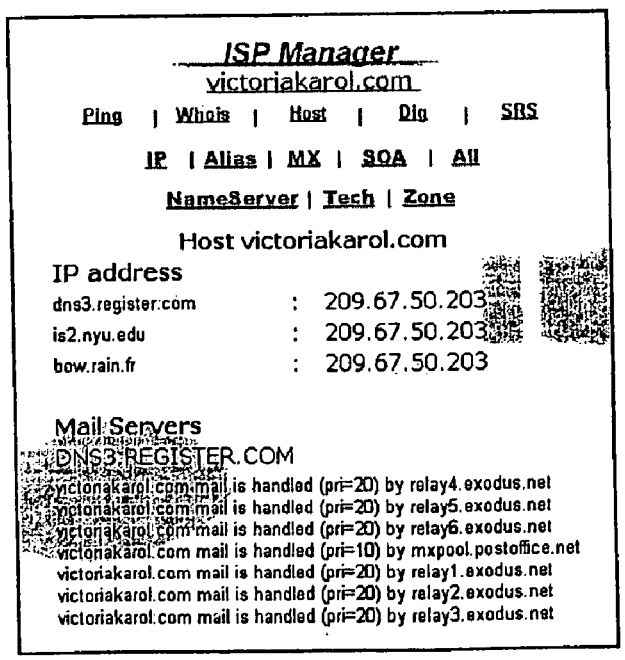
FIG. 10 illustrates an exemplary response screen that might be generated by the domain manager to communicate a response to a diagnostic utility such as the particularly illustrated response to a host query.

Particularly preferred embodiments of a domain manager in accordance with the present invention provide a set of diagnostic tools for evaluating the state and working condition of a registrant's domain. An exemplary set of diagnostic functions is illustrated on the upper line of the function select screen of FIG. 3, including ping, Whois, host, dig and SRS. Selecting one of these functions runs the diagnostic function on the active domain name. The domain manager runs the diagnostic function and returns the results in the form of response screen such as that illustrated in FIG. 10. FIG. 10 shows the results of the host function, which accesses the SRS and lists out the IP address for the host domain name and the aliases associated with that same IP address. The host utility also returns information about the mail exchange servers for the host domain name. Further discussion of the diagnostic functions is now set forth.

The ping utility is used to determine whether or not an address at a certain domain name is active or responding. When the ping utility is selected, the domain manager sends a packet of information to the domain name being diagnosed and waits for a response. If the target domain is active and operating properly, the domain server returns a message including the IP address to which the domain name resolves. Most preferably, the pin utility also returns the time required for the packet to make the round trip from the domain manager to the target domain and a response to return to the domain manager.

The Whois utility causes the domain manager to issue a Whois query. A Whois database is a database maintained by a registrar that contains information about the domain names registered through the registrar. The information within the Whois database might include the registering organization (i.e., the registrant) and various contact information for the technical, zone and administrative contacts for the domain. Consequently, the Whois utility causes the domain manager to issue a Whois query. The Whois database for the target domain returns the identity of the registrant and the contact information related to the domain name. Different Whois databases will return different sets of information due to the non-standard definition of Whois databases.

The host utility causes the domain manager to make a host inquiry of the domain name, which returns the information illustrated in FIG. 10. This utility can be used to ensure that the IP address for a site has properly propagated through the network of domain name servers. In this regard, the domain manager executing the host utility queries a plurality of different name servers, for example three name servers, to determine if all of the name servers resolve the same IP address for the target domain name. A positive result from the host query indicates that the domain name has propagated well through the name server network.

Other diagnostic functions preferably provided by the domain manager to operators to efficiently act as agents in managing a registrant's domain include the dig and SRS utilities. The dig utility queries one of the thirteen root servers to find the name server that is authoritative for a specific domain name. A dig can be used to determine whether the information for a domain name has been updated on the root server level by the shared registry system or the registry responsible for each country code top-level domain. The SRS utility causes the domain manager to search the shared registry system to determine if a domain name is registered, when it was registered, when it was last modified and what name servers are authoritative for the domain name.

For most of these diagnostic utilities, the domain manager can execute the utility regardless of the authoritative name server for the domain name. This is different for the SRS utility, where the domain name server can only execute SRS queries for domains within the .com, .net and .org top-level domains and for domains that use servers associated with the domain manager server as authoritative domain name servers.

Figure 11:
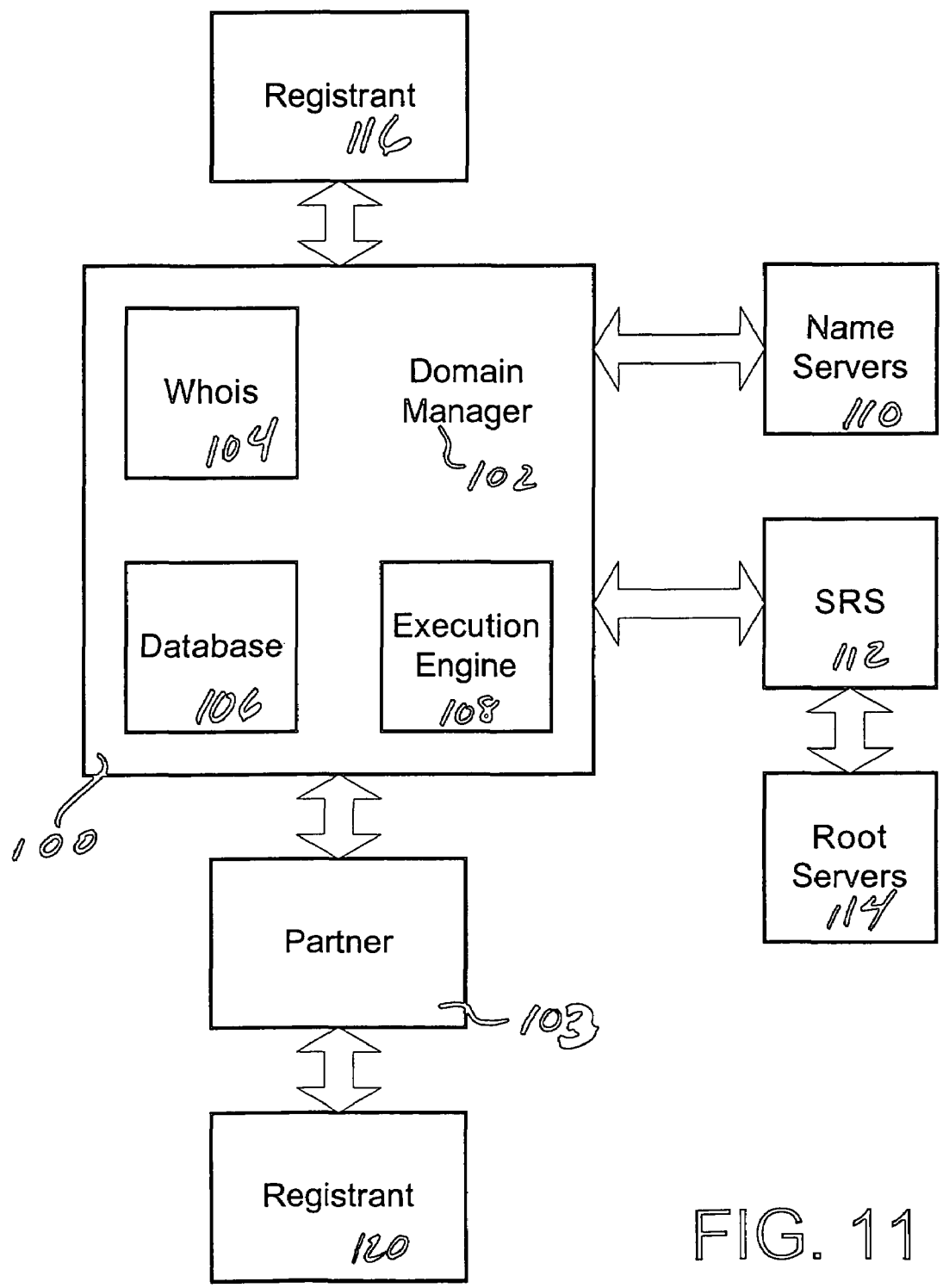
FIG. 11 illustrates schematically certain aspects of an exemplary system in which different aspects of the present invention operate.

FIG. 11 provides a further illustration of aspects of preferred implementations of the present invention. FIG. 11 illustrates a number of different servers and network connections that might be accessed in the practice of different aspects of the present invention. In this illustration, the server 100 is the server of an accredited registrar. It should be appreciated that, in many high volume applications, the illustrated server may consist of a number of servers configured as a single server farm or distributed over a number of different physical locations. All of the connections between different servers are two-way communication links, preferably over a wide area network such as the Internet using standard messaging protocols. Aspects of the domain manager are embodied in this illustration as software 102 running on the server 100 of the accredited registrar. In other embodiments, the domain manager may be implemented as software on a fixed storage medium such as optical disk storage, magnetic disk storage, magnetic tape or one of the various forms of semiconductor memories. Still other aspects of the present invention provide the domain manager as a method not fixed to any particular medium but instead embodied in the processes of aspects of the present invention.

A number of programming languages could be used to construct the common gateway interface ("CGI") program that enables data entered into to fields of the various interfaces illustrated in FIGS. 1–10 to interact with database records, a preferred embodiment is a CGI program written in PERL, C or a scripting language. This code is a shell that accesses in most cases a database that coordinates and accomplishes much of the functionality of the domain manager. Present embodiments of the domain manager application utilize an Oracle database solution. This is a particularly preferred database solution, although other solutions are presently known and other implementations of appropriate solutions are to be expected in the future. The database, as a whole, provides a great deal of information pertaining to the domain's zone information (i.e., domain name servers, IP addresses, aliases, mail exchange servers, etc.), as well as information pertaining specifically to how the domain name was registered.

Most preferably, the database segments domain-specific information into well-normalized tables. These tables contain a complete historical record of domain name registrations, modifications, and bills. For instance, by scanning particular tables in the database, one can glean information regarding the changes to IP address which have been initiated, as well as which user (either the registrant or an agent acting on their behalf) performed the modification. Separately, one can determine changes to name servers, mail exchange servers, and more.

The domain manager application interacts with the presently preferred Oracle database through the use of PL/SQL stored functions and procedures. Most preferably, the domain manager application is not authorized to perform ANSI SQL statement requests on the database itself. This allows for a single transaction to occur through the concept of a function or procedure initiating each of the ANSI SQL statements. Additionally, there is the significant added benefit of security and reliability.

Each of the graphical interfaces, screens or GUIs may be constructed by conventional software programming techniques known in the art, such as visual builders. The underlying database application program product performs all database functions, such as storing information, searching through records, accessing records, and modifying records. A preferred database application program includes stored procedures. The program allowing the user to modify entries in fields on the GUI is a utility program or a wizard. A preferred CGI program mediates the interaction between the data entered into the fields of the GUI and the records in the database. The underlying shared access application program, for example a shared registration system application program, performs all DNS root server functions such as storing information, searching through records, accessing records and modifying records. Information is transmitted from the registrar to the SRS and then later the SRS generates flat files including the domain name information changes input through the database application program cause the SRS to be updated.

Referring once again to FIG. 11, the server 100 includes a number of facilities that might be accessed during operation of the domain manager 102. The domain manager 102 accesses the Whois database 104 and domain manager-specific database 106 within the server 100 in the manner described above. The server 100 also contains an execution engine 108 that executes certain of the functions of the domain manager, such as running various scripts, applets, servlets or programs as discussed above. The server 100 accesses name servers 110 over the Internet in the conventional manner. Similarly, the server 100 accesses the shared registry system 112 over the Internet to provide the information to the SRS that is later used to update the information on the Root Servers that make up the domain name system (DNS).

Registrants 116, or different representatives of registrants, may access the domain manager functionality directly within the accredited registrar's server. In other implementations, the domain manager's functionality is largely duplicated on a partner website to the accredited registrar. For example, the partner website might be a website hosting service or an Internet Service Provider, either of which might offer domain management services as a convenience to their customers. Most desirably, the appearance of the domain manager is customizable so that it can be personalized to the partner website 103.

On the other hand, it is desirable that the domain manager implemented on the partner website 103 has functionality similar to that of the domain manager 102 within the accredited server environment 100. This is accomplished, for those domain names registered through the partner website or for which the partner website has become authoritative, by providing the same level of domain management functionality for the different implementations of the domain manager, in the manner discussed above. In addition, accesses by the domain manager to the SRS are made in real time except that passing through additional web servers and communication links slows the communications. Thus a registrant 120 accessing the domain manager through the partner website 103 receives a substantially identical level of domain management functionality as does the registrant 116 that accesses a domain manager within the accredited registrar's server 100.

While aspects and certain advantages of the present invention have been described herein with reference to certain preferred embodiments of the present invention, it should be appreciated that the present invention is not limited to the particular embodiments thereof. Those of ordinary skill in the art will appreciate that modifications and variations on the basic teachings of the present invention might be made without varying from the fundamental teachings thereof. Consequently, the scope of the present invention is to be determined from the claims, which follow.

What is claimed is:

1. A domain name management system, comprising:

a domain name identifier that generates a graphical user interface on an operator computer that accepts input of a domain name from an agent and accepts input of identifying information about the agent accessing the domain name management system, the agent acting on behalf of a registrant of an active domain name, the graphical user interface providing the domain name identifier identification of a domain name to be an active domain name and the graphical user interface providing the identifying information to the domain name management system;

an authorization checker responsive to the identifying information about the agent, the authorization checker comparing the identifying information with stored information to determine if the agent is authorized to change information about the active domain name in the shared registry system and, if the agent is not authorized to change information about the active domain name in the shared registry system, the authorization checker generating a communication to administrative contact for the active domain name to determine if the agent is to be authorized within the domain name management system to change information about the active domain name in the shared registry system; and an information change engine responsive to a request from the agent to change information about the active domain name, the request from the agent input through a graphical user interface on the operator computer, the information change engine generating an information change request that changes the information about the active domain name in the shared registry system if the agent is authorized by the authorization checker.

2. The domain name management system of claim 1, wherein the information change engine resides on a server of an accredited registrar.

3. The domain name management system of claim 1, wherein the information change engine generates a confirmation message indicating success of the information change request.

4. The domain name management system of claim 1, wherein the information change engine resides on a server coupled to a second server capable of directly accessing a shared registry system.

5. The domain name management system of claim 4, wherein the information change request is passed through the second server and to the shared registry system.

6. The domain name management system of claim 1, wherein, in response to determining that the agent is authorized for the active domain name, the information change engine causes display of a screen listing a plurality of functions for changing information within a zone file for the active domain name.

7. A domain name management system, comprising:
an authentication interface generator that generates a graphical user interface on an operator terminal including a request for identification information from an operator seeking access to the domain name management system, the domain name management system receiving operator identification information input by the operator at the operator terminal;

a domain name identification interface generator that generates graphical user interface on the operator terminal including a request for input from the operator of a domain name to be an active domain name, the domain name management system receiving the domain name input by the operator at the operator terminal and setting the domain name as an active domain name;

an authentication checker that determines, in response to the identification information input by the operator, if a contact identified in the shared registry system for the active domain name has authorized the operator to change information within the zone file for the active domain name, the authentication checker preventing changes to the zone file for the active domain name if the operator is not authorized; and an information change engine responsive to the authentication checker and to an information change request input by an authorized operator, the information change engine changing information about the active domain name in the zone file for the active domain name and generating a confirmation message that at least in part caused display of a screen on the operator terminal confirming execution of the information change request, the domain name management system updating the shared registry system with the changed zone file.

8. The domain name management system of claim 7, further comprising a diagnostic utility engine, responsive to input by the operator of at least one diagnostic request, the diagnostic utility engine executing a diagnostic utility corresponding to the at least one diagnostic request on the active domain name, the diagnostic utility engine displaying a result of the diagnostic utility a within a graphical user interface on the operator terminal.

9. The domain name management system of claim 8, wherein the diagnostic utility accesses the shared registry system when executed.

10. The domain name management system of claim 9, wherein the diagnostic utility produces as output at least a portion of the zone file.

11. The domain name management system of claim 8, wherein the diagnostic utility accesses a plurality of name servers when executed.

12. The domain name management system of claim 7, wherein the information change engine resides on a server of an accredited registrar.

13. The domain name management system of claim 7, wherein the information change engine resides on a server that directly accesses the shared registry system.

14. The domain name management system of claim 7, wherein the information change engine resides on a server coupled to a second server that directly accesses the shared registry system.

15. The domain name management system of claim 14, wherein the information change request passes through the second server to the shared registry system.

16. The domain name management system of claim 7, wherein, in response to determining that the operator is authorized for the active domain name, the information change engine displays a listing of functions for changing information within the zone file for the active domain name.

17. The domain name management system of claim 16, wherein, if the operator is not authorized for the active domain name, the authentication checker determines if the operator should be authorized for the active domain name.

18. The domain name management system of claim 7, further comprising a function selection interface generator that generates a graphical user interface with a plurality of selectable functions for managing a domain name.

19. The domain name management system of claim 7, further comprising a function selection interface generator that generates a graphical user interface with a plurality of selectable functions for managing a domain name, the plurality of selectable functions including domain name diagnostics and zone file information change.

20. The domain name management system of claim 16, further comprising a diagnostic utility engine, responsive to input by the operator of at least one diagnostic request, the diagnostic utility engine executing a diagnostic utility corresponding to the at least one diagnostic request on the active domain name, the diagnostic utility engine returning a result of the diagnostic utility on the active domain name to a screen on the operator terminal.

* * * * *